United States Patent
Corrigan et al.

(10) Patent No.: US 7,389,400 B2
(45) Date of Patent: *Jun. 17, 2008

(54) APPARATUS AND METHOD FOR SELECTIVELY INVALIDATING ENTRIES IN AN ADDRESS TRANSLATION CACHE

(75) Inventors: Michael J. Corrigan, Rochester, MN (US); Paul LuVerne Godtland, Rochester, MN (US); Joaquin Hinojosa, Round Rock, TX (US); Cathy May, Millwood, NY (US); Naresh Nayar, Rochester, MN (US); Edward John Silha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/304,136

(22) Filed: Dec. 15, 2005

(65) Prior Publication Data

US 2007/0143565 A1    Jun. 21, 2007

(51) Int. Cl.
*G06F 12/00* (2006.01)

(52) U.S. Cl. .................. 711/203; 711/100; 711/133; 711/154; 711/205; 711/206; 711/207

(58) Field of Classification Search .......... 711/202, 711/205, 207
See application file for complete search history.

(56) References Cited

U.S. PATENT DOCUMENTS 6,338,128 B1 * 1/2002 Chang et al. ............ 711/203
2005/0182913 A1   8/2005 DeMent et al.

* cited by examiner

*Primary Examiner*—Matthew Kim
*Assistant Examiner*—Hetul Patel
(74) *Attorney, Agent, or Firm*—Martin & Associates, LLC; Derek P. Martin

(57) ABSTRACT

An apparatus and method selectively invalidate entries in an address translation cache instead of invalidating all, or nearly all, entries. One or more translation mode bits are provided in each entry in the address translation cache. These translation mode bits may be set according to the addressing mode used to create the cache entry. One or more "hint bits" are defined in an instruction that allow specifying which of the entries in the address translation cache are selectively preserved during an invalidation operation according to the value(s) of the translation mode bit(s). In the alternative, multiple instructions may be defined to preserve entries in the address translation cache that have specified addressing modes. In this manner, more intelligence is used to recognize that some entries in the address translation cache may be valid after a task or partition switch, and may therefore be retained, while other entries in the address translation cache are invalidated.

1 Claim, 6 Drawing Sheets

| Hint Bits | | | | Action to Take | |
|---|---|---|---|---|---|
| HV | Mode3 | Mode2 | Mode1 | | |
| X | 0 | 0 | 0 | Invalidate All ERAT Entries | 810 |
| X | 1 | 1 | 1 | Preserve All Mode3 Entries, All Mode2 Entries, and Long-Lived Mode1 Entries | 820 |
| X | 1 | 1 | 0 | Preserve All Mode3 and Mode2 Entries | 830 |
| 0 | 1 | 0 | 0 | Preserve All Mode3 Entries | 840 |
| 1 | 1 | 0 | 0 | Preserve All Mode3 Entries that have HV Bit Set to One | 850 |

| Translation Modes | |
|---|---|
| 1 | EA translated through SLB to produce VA, which is translated through Page Table to produce RA |
| 2 | VA is direct mapping of EA, so VA is translated directly through Page Table to produce RA |
| 3 | EA is translated by hardware into RA |

| Hint Bits | | | | Action to Take | |
|---|---|---|---|---|---|
| HV | Mode3 | Mode2 | Mode1 | | |
| X | 0 | 0 | 0 | Invalidate All ERAT Entries | 810 |
| X | 1 | 1 | 1 | Preserve All Mode3 Entries, All Mode2 Entries, and Long-Lived Mode1 Entries | 820 |
| X | 1 | 1 | 0 | Preserve All Mode3 and Mode2 Entries | 830 |
| 0 | 1 | 0 | 0 | Preserve All Mode3 Entries | 840 |
| 1 | 1 | 0 | 0 | Preserve All Mode3 Entries that have HV Bit Set to One | 850 |

APPARATUS AND METHOD FOR SELECTIVELY INVALIDATING ENTRIES IN AN ADDRESS TRANSLATION CACHE

BACKGROUND OF THE INVENTION

1. Technical Field

This invention generally relates to computer systems, and more specifically relates to the field of addressing schemes in computer systems.

2. Background Art

Computer systems have addressing capabilities that are defined by the computer hardware. The address space of a computer system is the range of addresses available to reference data, instructions, etc., and is determined by the size (in bits) of the address. The address size is one of the fundamental architectural features of a computer system. Early computer systems were single-user computers that could handle only a single task at a time, mapping all data into a single address space, and swapping data into and out of the address space whenever a new task needed to be performed. Later, computers were developed that supported multiple users and processes (or tasks). A computer system that supports multiple tasks must manage the allocation of the address space among the different tasks. That is, the effective addresses specified or computed by programs running in multiple tasks must be efficiently translated into real (physical) addresses used to access memory. More than one such address translation mechanism, or mode, may be provided by a single computer system. Examples of some address translation modes are given next.

Because the address space for all the tasks that might run on a computer system typically exceeds the system's physical address space size, a separate address space is typically allocated to each task, resulting in multiple virtual address spaces. This type of addressing is known as "local addressing", because each task has its own virtual address space that is local to the process, and cannot be seen by other tasks.

Local address translation logic typically provides translation of effective addresses to virtual addresses, and virtual addresses to real (or physical) addresses using tables stored in memory and in registers in the processor. For example, a Segment Lookaside Buffer (SLB) may be used to translate high-order bits of an effective address to high-order bits of a virtual address. In addition, address translation caches may be used to store recently-used address translations, thereby speeding execution of subsequent uses of the same translations. One type of address translation cache translates effective addresses directly to real addresses (ERAT). These caches speed computation by avoiding the two step process of translating an effective address to a virtual address and then translating the resulting virtual address to a real address. However, because effective address space values for different tasks typically must be translated to different virtual and real addresses, when an operating system switches from one task to another, the address translations must be changed, so nearly all of the cached local addressing translations must be invalidated as part of task switch processing. Note that a subset may be reserved by operating system convention for common use in more than one process or for use by the task switch code, so these entries need not be invalidated.

Another addressing mode used by some systems is a static or direct mapping between effective and virtual addresses, so the SLB is not used. For this addressing mode, all tasks share this portion of the effective address space. Thus a task switch does not change any part of the effective to real mapping, so ERAT entries derived from these translations remain valid.

More recently, computer systems have become capable of supporting multiple logical systems on the same hardware complex, through the use of a layer of firmware called a hypervisor. Each logical system image may be referred to as a partition. On such systems, the hypervisor must manage the hardware address translation facilities in a manner that strictly separates the address spaces used by different partitions, because each partition represents an independent system image. Another type of addressing mode supported by these systems is when the operating system thinks it is directly using real addresses, but in reality hardware features managed by a hypervisor interject some other form of address translation. These address translations are inherently global to a logical partition and so should survive task switches within a logical partition, but must be invalidated during partition switches. As a final example, hypervisor real address use is not affected by task switches or partition switches.

In known systems, task and partition switches typically perform a mass invalidation of address mappings, including invalidation of all entries in an effective to real address translation cache. Task switches are common and must typically invalidate the Segment Lookaside Buffer (SLB) anyway, so this mass invalidation might be accomplished as a side-effect of an instruction that invalidates the SLB, for example. By performing a mass invalidation of entries in an effective to real address translation cache, the prior art systems implicitly assume that none of the address translations in the effective to real address translation cache will be valid after a task or partition switch. This assumption, however, is not correct, because some of the address translations in the effective to real address translation cache remain valid even after a task or partition switch. Without an effective apparatus and method for selectively invalidating entries in an address translation cache, the prior art will continue to suffer from the performance penalty that results from invalidating too many entries in an address translation cache, too frequently.

DISCLOSURE OF INVENTION

According to the preferred embodiments, an apparatus and method selectively invalidate entries in an address translation cache instead of invalidating all, or nearly all, entries. One or more translation mode bits are provided in each entry in the address translation cache. These translation mode bits may be set according to the addressing mode used to create the cache entry. One or more "hint bits" are defined in an instruction that allow specifying which of the entries in the address translation cache are selectively preserved during an invalidation operation according to the value(s) of the translation mode bit(s). In the alternative, multiple instructions may be defined to preserve entries in the address translation cache that have specified addressing modes. In this manner, more intelligence is used to recognize that some entries in the address translation cache may be valid after a task or partition switch, and may therefore be retained, while other entries in the address translation cache are invalidated.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide a way to selectively invalidate entries in an address translation cache, thereby potentially retaining entries that may remain valid even after a task or partition switch occurs. A task switch on a processor may be made between processes running on a single system or in a partition on a logically partitioned system. The preferred embodiments also apply when the hypervisor switches partitions on a processor in a logically partitioned system. One or more address translation mode bits are provided for each entry in an address translation cache to indicate the addressing mode for the entry. When a task or partition switch occurs, an instruction may be executed that will cause only some of the entries in the address translation cache to be invalidated. In this manner, address translations that remain valid across task or partition switches may be retained, thereby improving performance of the computer system.

Figure 2:
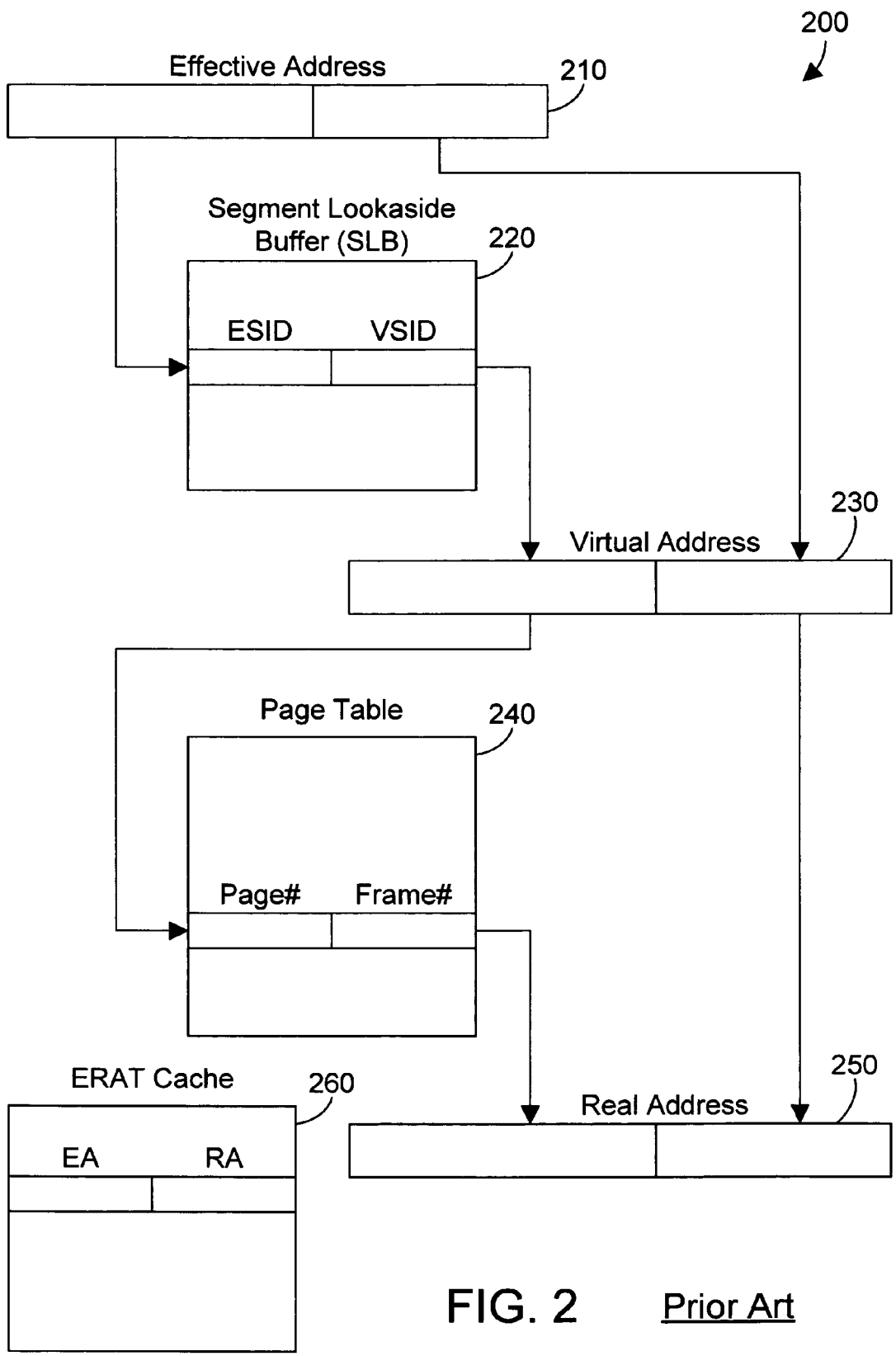
FIG. 2 is a block diagram showing a known address translation system that includes an Effective to Real Address Translation cache (ERAT cache)

Referring to FIG. 2, a prior art address translation mechanism 200 is shown that translates an effective address 210 to a virtual address 230, which is then translated to a real address 250. The translation of the effective address 210 to the virtual address 230 is done using a Segment Lookaside Buffer (SLB) 220, which is known in the art. Each entry in the SLB typically includes an Effective Segment ID (ESID) and a corresponding Virtual Segment ID (VSID). The high order bits of the effective address 210 are compared to the ESIDs in the SLB 220, and when a match is found, the corresponding VSID is output by the SLB as the high order bits of the virtual address 230. The high order bits of the virtual address 230 constitute a virtual page number (VPN), which is compared to the VPNs in the page table 240, and when a match is found, the corresponding real page frame number is then output by the page table 240 as the high order bits of the real address 250. Note that the low order bits of the effective address 210 are preferably passed directly to the low order bits of the virtual address 230, and are passed on to the low order bits of the real address 250. Note that system 200 also includes an Effective to Real Address Translation (ERAT) cache 260.

Each entry in the ERAT cache preferably includes an effective address (EA) and corresponding real address (RA), as shown in ERAT cache 260 in FIG. 2. Translating an address from effective to virtual to real is an expensive operation for a processor. By storing effective to real address translations in the ERAT cache 260, the processor may retrieve and use a recently-stored address translation without having to perform the address translation anew. The ERAT cache 260 thus provides enhanced performance by allowing a processor to reuse recently-generated address translations.

Figures 3, 4:
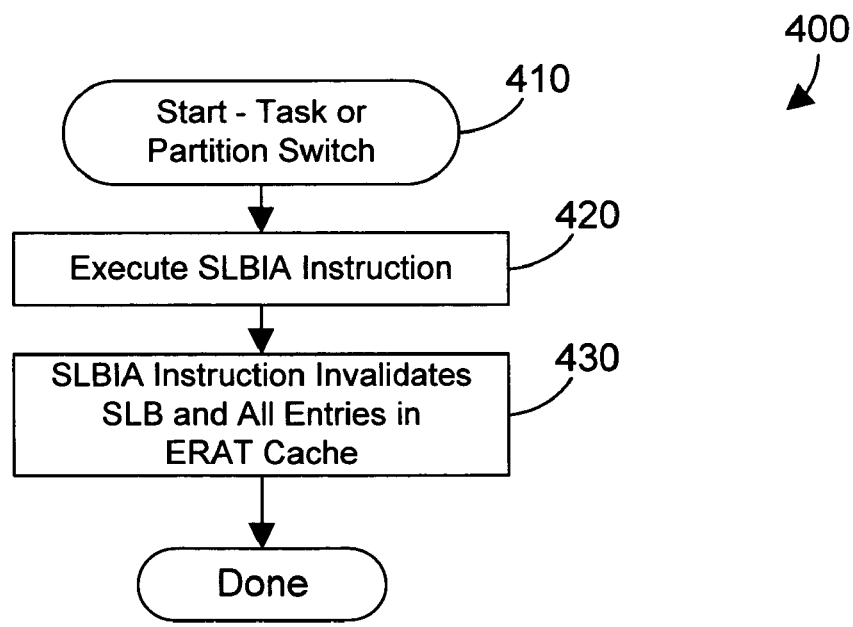
FIG. 3 is a table showing three different address translation modes in a typical iSeries computer system that runs the i5/OS operating system.
FIG. 4 is a flow diagram of a prior art method for invalidating all or nearly all entries in an ERAT cache.

Referring to FIG. 3, address translation modes are listed for a typical iSeries computer system running the i5/OS operating system. Both iSeries and i5/OS are trademarks of the IBM Corporation. Table 300 in FIG. 3 shows three different address translation modes. Mode 1 corresponds to an effective address (EA) that is translated through the SLB to provide a virtual address (VA), which is then translated through a page table to produce a real address (RA). Mode 2 is when the virtual address is a direct mapping of the effective address, so a static algorithm determines the virtual address given the effective address. Then the virtual address is translated through the page table to produce the real address. Mode 3 is when the operating system thinks it is directly using real addresses, but in reality hardware features managed by a hypervisor interject some other form of address translation. These mode 3 translations are inherently global to a logical partition and so should survive task switches within a logical partition.

Referring now to FIG. 4, a method 400 begins when a task or partition switch is performed (step 410). An SLBIA instruction is then executed (step 420). The SLBIA instruction is defined in the PowerPC instruction set, and is the Segment Lookaside Buffer Invalidate All instruction. Note that the SLBIA instruction in step 420 is one specific example of a Clear Address Translation Cache instruction 112 in FIG. 1. Executing the SLBIA instruction in step 420 invalidates all entries in the SLB 220 (except for the first, or zeroth entry), and has the side-effect of also invalidating all entries in the ERAT cache 260 shown in FIG. 2 (step 430). As a result, a task or partition switch 410 in the prior art method 400 always results in invalidation of all entries but one in the SLB, and all entries in the ERAT cache.

Understanding the three translation modes in FIG. 3 is important because some of the mode 1 address translations, all of the mode 2 translations, and all of the mode 3 translations are valid even after a task switch, unless switching to another logical partition. Thus, we see that the side-effect of the SLBIA instruction, which invalidates all entries in the ERAT cache and almost all of the entries in the SLB, can result in a performance penalty because not all the entries in the ERAT cache needed to be invalidated. The preferred embodiments provide a way to selectively invalidate entries in an address translation cache, as explained in more detail below.

Figure 1:
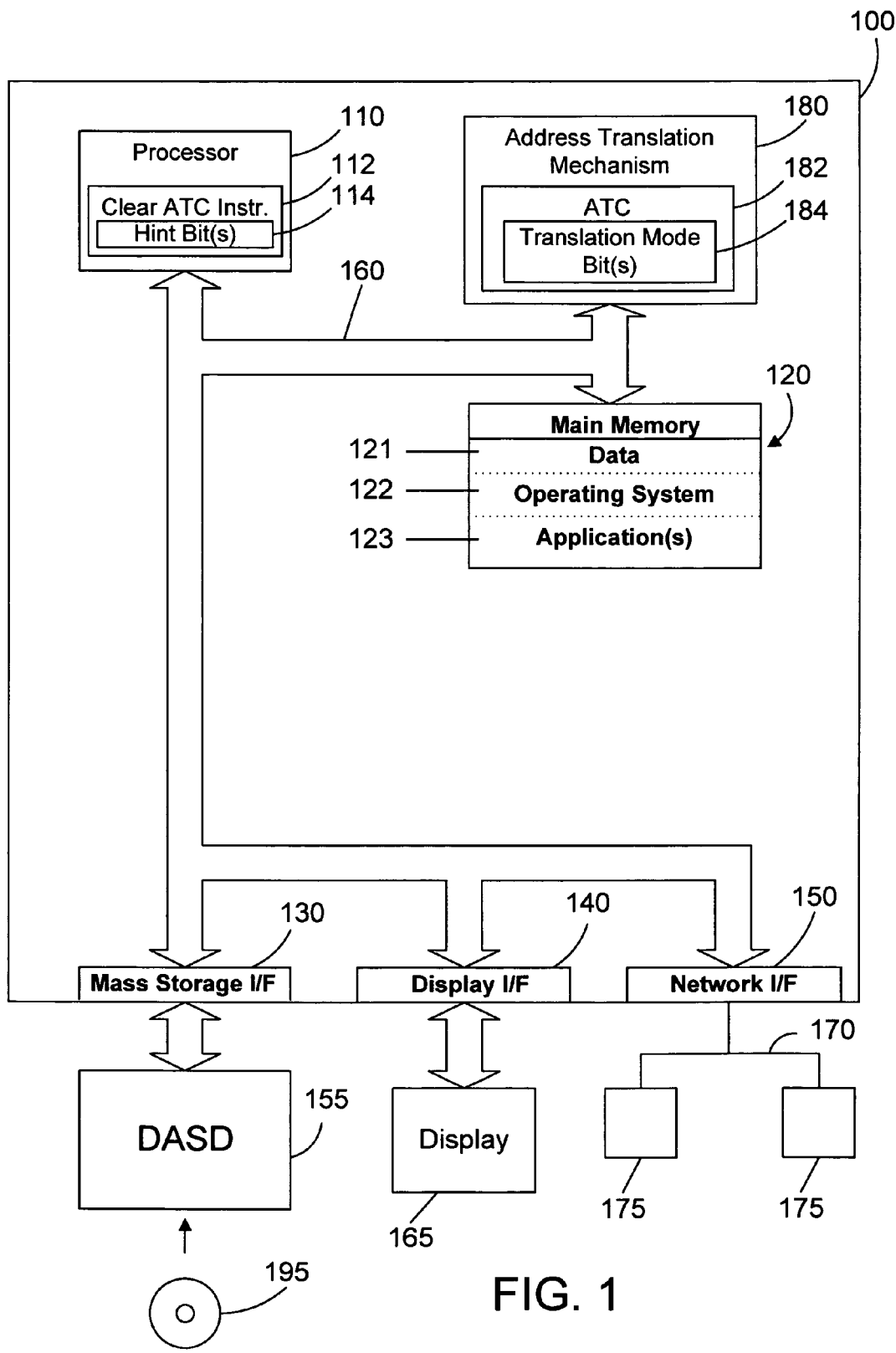
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system with multiple addressing modes, regardless of whether the computer system is a complicated multi-user computing apparatus, a single user workstation, an embedded control system, or multiple computer systems that cooperate to perform a desired task. As shown in FIG. 1, computer system 100 comprises a processor 110, a main memory 120, a mass storage interface 130, a display interface 140, a network interface 150, and an address translation mechanism 180. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195 (shown in FIG. 1). Another specific type of direct access storage device 155 is a magnetic hard disk drive.

Main memory 120 in accordance with the preferred embodiments contains data 121, an operating system 122, and one or more software applications 123. Data 121 represents any data that serve as input to or output from any program in computer system 100. Operating system 122 is a multitasking operating system known in the industry as i5/OS; however, those skilled in the art will appreciate that the spirit and scope of the present invention is not limited to any one operating system. Software applications 123 may include any suitable software that may be executed by the processor 110.

Computer system 100 utilizes well known virtual addressing mechanisms that allow the programs of computer system 100 to behave as if they have access to a large, single storage entity instead of access to multiple, smaller storage entities such as main memory 120 and DASD device 155. Therefore, while data 121, operating system 122, and applications 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100.

An address translation mechanism 180 is provided to translate between effective, virtual, and real addresses. The address translation mechanism 180 preferably includes an address translation cache (ATC) 182 that includes multiple address translations. The address translation cache 182 preferably includes multiple entries, with each entry including one or more translation mode bits 184. The translation mode bit(s) 184 indicate the addressing mode of the entry, thereby allowing more intelligent decisions regarding which entries in the address translation cache 182 need to be invalidated, and which can be preserved.

Processor 110 may be constructed from one or more microprocessors and/or integrated circuits. Processor 110 preferably includes an instruction 112 in its instruction set that may be used for invalidating the address translation cache 182. The Clear Address Translation Cache instruction 112 preferably includes one or more hint bits 114 that provide one or more criteria for the processor 110 to determine which of the entries in the address translation cache 182 should be invalidated and which should be preserved when the Clear Address Translation Cache instruction 112 is executed by the processor 110.

Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, system bus 160, and address translation mechanism 180.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other tasks may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figure 5:
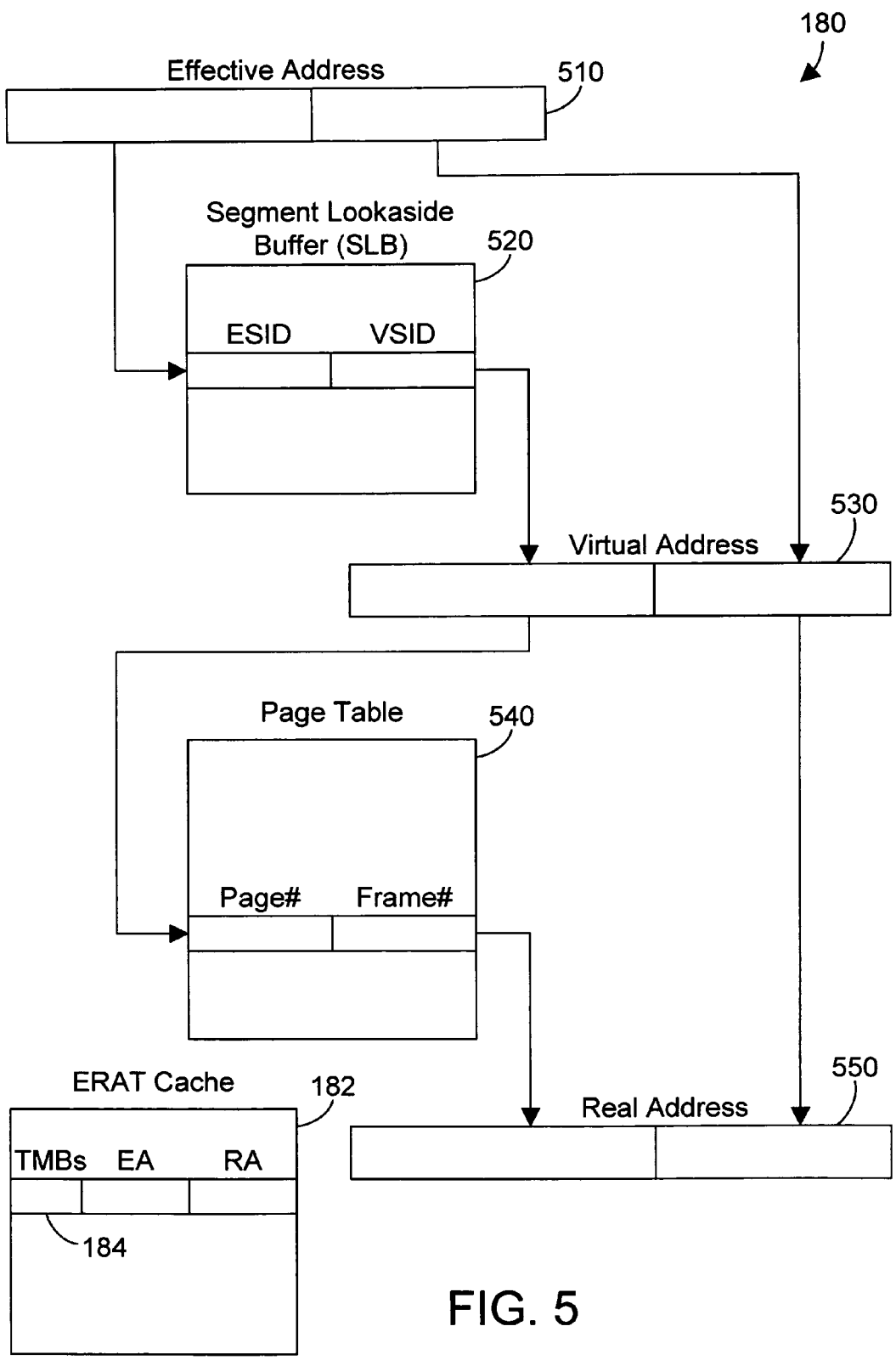
FIG. 5 is a block diagram of an address translation system that includes an ERAT cache in accordance with the preferred embodiments.

The address translation mechanism 180 in FIG. 1 is shown in more detail in FIG. 5. The address translation mechanism 180 translates an effective address 510 to a virtual address 530 using an SLB 520, and translates the virtual address 530 to a real address 550 using a page table 540. Note that the function of the SLB 520 and page table 540 are preferably the same as for prior art SLB 220 and page table 240 shown in FIG. 2. The address translation mechanism 180 also includes an ERAT cache 182, which is a specific example of an address translation cache 182 shown in FIG. 1. The difference between the ERAT cache 182 and the prior art ERAT cache 260 in FIG. 2 is that ERAT cache 182 includes one or more translation mode bits (TMBs) for each entry, in addition to the effective address (EA) and real address (RA). The translation mode bit(s) may be used to selectively invalidate entries in the ERAT cache 182 as described in more detail below.

Figures 6, 7:
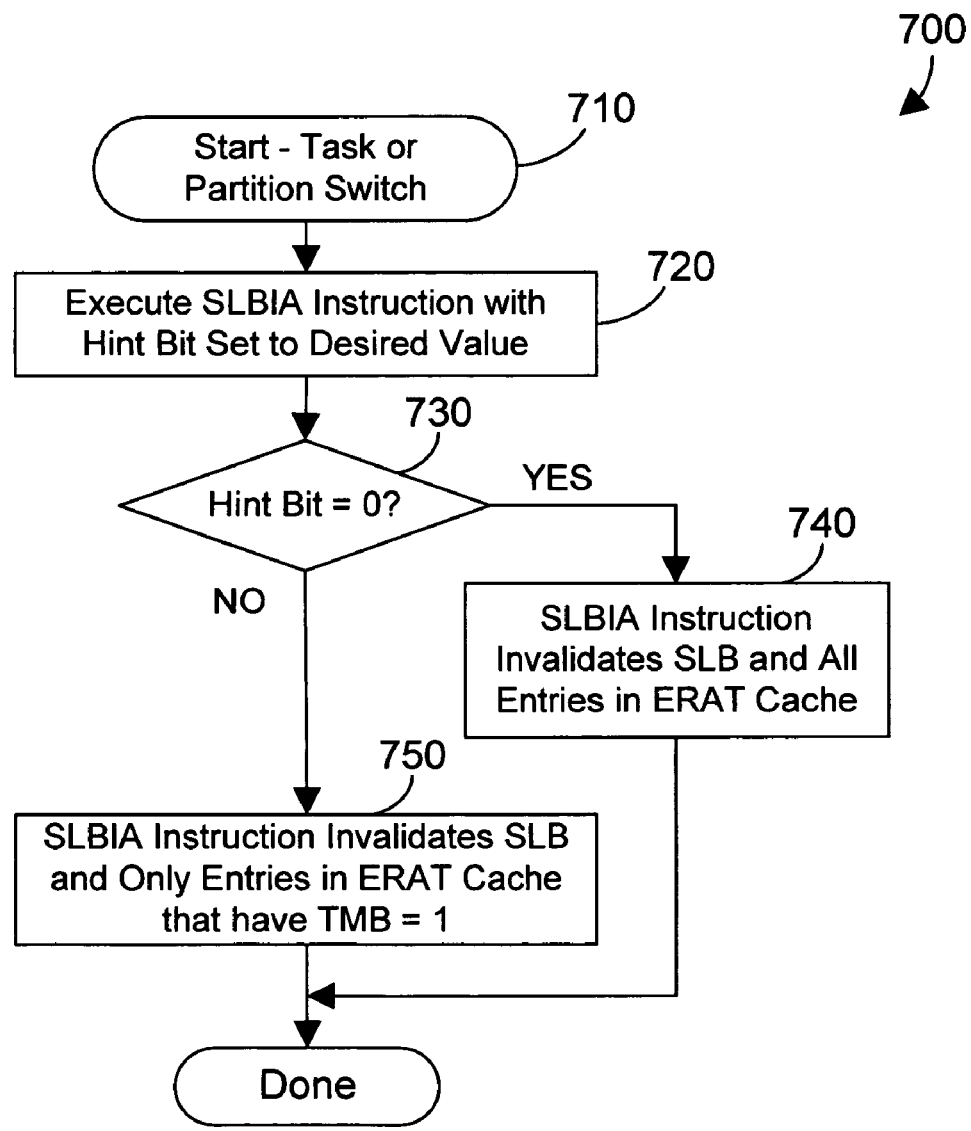
FIG. 6 is a table showing values of a single translation mode bit and corresponding address translation modes for a first embodiment.
FIG. 7 is a flow diagram of a method for selectively invalidating entries in an address translation cache in accordance with the first embodiment.

In a first embodiment, a single translation mode bit is provided that differentiates between Mode 1 and Modes 2 and 3 shown in FIG. 3. Referring to FIG. 6, when the translation mode bit is zero, this means the corresponding entry in the address translation cache is a Mode 2 or Mode 3 address translation. When the translation mode bit is one, this means the corresponding entry in the address translation cache is a Mode 1 address translation. Note that Mode 2 and Mode 3 address translations are valid even after a task switch, unless the switch is between logical partitions, while some Mode 1 address translations may not be valid after any task switch. We now examine how the translation mode bit shown in FIG. 6 may be used to selectively invalidate cache entries in an address translation cache.

Referring to FIG. 7, a method 700 in accordance with the preferred embodiments starts when the operating system decides to switch tasks or the hypervisor decides to switch partitions (step 710). In response, the operating system or hypervisor executes an SLBIA instruction with a hint bit set to a desired value (step 720). The SLBIA instruction, as explained above, is an instruction defined in the PowerPC instruction set that invalidates all entries except the first entry in the segment lookaside buffer (SLB) (520 in FIG. 5). The SLBIA instruction has bits 7-10 that are reserved for future use. One of these bits may be used as a "hint bit" to indicate to the processor that executes the SLBIA instruction whether to invalidate all entries in the ERAT cache or whether to selectively invalidate entries in the ERAT cache. If the value of the hint bit is zero (step 730=YES), the SLBIA instruction invalidates both the Segment Lookaside Buffer (SLB) and all the entries in the ERAT cache (step 740). If the value of the hint bit is one (step 730=NO), the SLBIA instruction invalidates the SLB and only those entries in the ERAT cache that have their TMBs set to one (step 750), thereby preserving those entries in the ERAT cache that have their TMBs set to a zero. By providing a single TMB in the ERAT cache 182, and providing a single bit in the SLBIA instruction that indicates whether to perform complete or selective invalidation of cache entries, the preferred embodiments provide the capability of selectively invalidating only those entries in the ERAT cache 182 that have a TMB value of 1, meaning that only those entries that are Mode 1 entries, are invalidated, thereby preserving the Mode 2 and Mode 3 entries in the ERAT cache 182. Note that the hint bits are merely suggestions regarding what entries could be preserved at the discretion of the hardware, which may choose to heed the hint bits, thereby preserving some of the entries, or may disregard the hint bits, thereby invalidating all of the entries. In the preferred embodiments, entries that are not marked to be preserved must be invalidated.

Figures 8, 9:
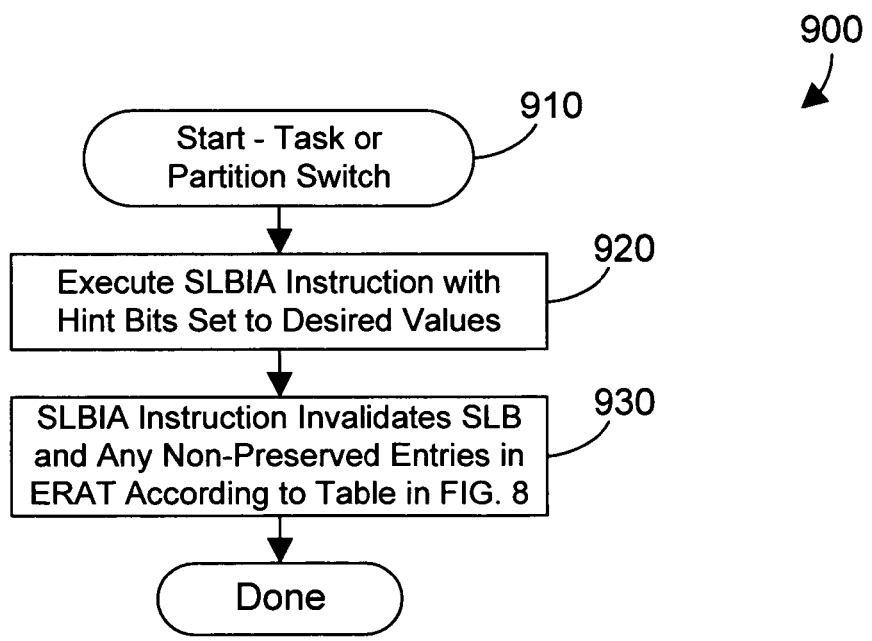
FIG. 8 is a table showing four hint bits and corresponding actions to take to selectively preserve entries in an address translation cache during an invalidation operation in accordance with a second embodiment.
FIG. 9 is a flow diagram of a method for selectively invalidating entries in an address translation cache in accordance with the second embodiment.

In the first embodiment discussed above with respect to FIGS. 6 and 7, a single translation mode bit is used and a single hint bit is used. In the second embodiment, multiple translation mode bits are used and multiple hint bits are used. We assume that four translation mode bits are defined, and correspond to four hint bits that may be specified in the SLBIA instruction in bits 7-10. The four hint bits are labeled HV, Mode 3, Mode 2, and Mode 1 as shown in FIG. 8. Each entry in the address translation cache may have the HV bit set to either value, and will have only one of the Mode 3, Mode 2 and Mode 1 bits set to one to indicate the addressing mode of the entry. The HV bit is a special bit that has meaning only in the context of a real mode (i.e., Mode 3) entry of the address translation cache. In all other cases, the value of the HV bit does not matter, as represented by the Xs in FIG. 8, which indicate "don't care." The Mode 3, Mode 2 and Mode 1 hint bits are set to a value of one to indicate to the processor that the SLBIA instruction should preserve entries in the address translation cache that have an addressing mode that corresponds to the mode(s) with the 1 set in the hint bits. Thus, when the hint bits for Mode 3, Mode 2 and Mode 1 are all zero, the execution of the SLBIA instruction will cause all ERAT entries to be invalidated, as indicated in row 810 in FIG. 8. All zeroes effectively means "preserve none", so all entries in the ERAT cache are invalidated. When the hint bits for Mode 3, Mode 2 and Mode 1 are all one, this means the execution of the SLBIA instruction will preserve all Mode 3, Mode 2 and long-lived Mode 1 entries in the address translation cache, as indicated in row 820 in FIG. 8. A Mode 1 entry is long-lived if the entry is valid for multiple processes. When the hint bits for Mode 3 and Mode 2 are one but the hint bit for Mode 1 is zero, this means the Mode 1 entries (long-lived and short-lived) must not be preserved, which means that only the Mode 3 and Mode 2 entries will be preserved, as shown in row 830 in FIG. 8. When the hint bits for Mode 3 is one and the hint bits for Mode 2 and Mode 1 are zero, the action taken by the processor when executing the SLBIA instruction depends on the value of the HV hint bit. When the HV hint bit is zero, as shown in row 840 in FIG. 8, all entries in the address translation cache that are Mode 3 entries (i.e., that have the Mode 3 TMB set) will be preserved, while all Mode 2 and Mode 1 entries will be invalidated. When the HV hint bit is one, as shown in row 850 in FIG. 8, all entries in the address translation cache that are Mode 3 entries that have a corresponding HV bit set to one will be preserved and all other entries will be invalidated. The HV bit is set to one to indicate that the address translation was made by a hypervisor, which is a layer of firmware for managing logical system partitions, as described in more detail above.

Referring now to FIG. 9, a method 900 in accordance with the preferred embodiments starts when the operating system decides to switch tasks or the hypervisor decides to switch partitions (step 910). The operating system or hypervisor executes an SLBIA instruction with hint bits set to desired values (step 920). The SLBIA instruction invalidates the Segment Lookaside Buffer and all entries in the ERAT cache for which the SLBIA instruction does not specify preservation according to the table in FIG. 8 (step 930). In this manner, the hint bits in an SLBIA instruction may dictate which entries in an address translation cache are invalidated, and which are preserved, according to the values of the hint bits and the values of the translation mode bits in each entry in the cache. The preferred embodiments thus provide a way to selectively control which entries get invalidated in an address translation cache even when there is no dedicated instruction that operates on the address translation cache.

Note that the Segment Lookaside Buffer could also include one or more hint bits. For example, the SLB could include a single hint bit to indicate whether or not the entry corresponds to a long-lived class of SLB entry. If so, the SLB entries with the corresponding hint bit set to one could be preserved as well. This simple example shows the preferred embodiments expressly extend to any and all translation mode caches.

In the preferred embodiments disclosed herein, there is a one-to-one correspondence between hint bits in the SLBIA instruction and translation mode bits in the ERAT entries. Note, however, that this need not be the case. The preferred embodiments expressly extend to any suitable definition of hint bit(s) and translation mode bit(s) that allow selectively invalidating entries in an address translation cache.

Note that there may be multiple levels of address translation caches, and the preferred embodiments may be used at any or all levels of a multi-level cache. In addition, the preferred embodiments herein show the use of hint bits in an SLBIA instruction as a way to indirectly control the selective invalidation of entries in an address translation cache. The preferred embodiments also extend to an instruction that operates directly on the address translation cache, rather than having ERAT invalidations be a side effect of a different instruction. In addition, multiple instructions could be provided, instead of a single instruction with different combinations of hint bits. Thus, an Address Translation Cache Invalidate All (ATCIA) instruction could be defined that invalidates all ERAT entries, as shown in row 810 in FIG. 8. An Address Translation Cache Invalidate Minimum (ATCIM) instruction could be defined that invalidates only the short-lived Mode 1 entries, as shown in row 820 in FIG. 8. In similar fashion, separate instructions could be defined that perform the functions shown in rows 830, 840 and 850 in FIG. 8. The preferred embodiments extend to any suitable way to define any instruction or variant thereof that performs selective invalidation of any entries in an address translation cache.

The preferred embodiments provide an enhanced address translation cache by including one or more translation mode bits for each entry in the address translation cache to indicate an addressing mode for the entry. In addition, a processor defines one or more instructions in its instruction set that allow selectively invalidating one or more entries in the address translation cache according to the value of translation mode bits for the entries. By selectively invalidating only some entries in the address translation cache, namely those for which the translation will be invalid as a result of a particular task or partition switch, the address translation cache will include translations that will still be valid after the task or partition switch, thereby enhancing system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for selectively invalidating entries in an address translation cache, the method comprising the steps of:

providing four translation mode bits in each of a plurality of entries in the address translation cache, the four translation mode bits including a Mode 1 bit that indicates an effective address that is translated through a segment lookaside buffer to provide a virtual address which is then translated through a page table to produce a real address, a Mode 2 bit that indicates a virtual address is a direct mapping of an effective address, a Mode 3 bit that indicates real addressing mode, and an HV bit, wherein only one of the Mode 1, Mode 2 and Mode 3 bits are set for each entry in the address translation cache to indicate a corresponding addressing mode for the corresponding entry, and the HV bit has meaning only when the Mode 3 bit is set;

writing to the four translation mode bits for an entry in the address translation cache to indicate an address translation mode for the entry; and executing an instruction that includes four hint bits that define a plurality of addressing modes to preserve during an address translation cache invalidation operation, the Mode 1 hint bit corresponding to the Mode 1 bit in the address translation cache, the Mode 2 hint bit corresponding to the Mode 2 bit in the address translation cache, the Mode 3 hint bit corresponding to the Mode 3 bit in the address translation cache, and the HV hint bit corresponding to the HV bit in the address translation cache, wherein more than one of the Mode 1 hint bit, Mode 2 hint bit and Mode 3 hint bit may be set in the instruction, wherein entries in the address translation cache that have bits set that correspond to set hint bits are preserved during an address translation cache invalidation operation, wherein if the Mode 1 hint bit, Mode 2 hint bit and Mode 3 hint bit are all cleared, all entries in the address translation cache are invalidated during the address translation cache invalidation operation, wherein if the Mode 1 hint bit is set, all long-lived entries in the address translation cache that have the Mode 1 bit set are preserved during the address translation cache invalidation operation, wherein if the Mode 2 hint bit is set, all entries in the address translation cache that have the Mode 2 bit set are preserved during the address translation cache invalidation operation, wherein if the Mode 3 hint bit is set and the HV hint bit is cleared, all entries in the address translation cache that have the Mode 3 bit set are preserved during the address translation cache invalidation operation, wherein if the Mode 3 hint bit is set and the HV hint bit is set, all entries in the address translation cache that have the Mode 3 bit set and the HV bit set are preserved during the address translation cache invalidation operation.

* * * * *